(12) United States Patent
Abriol et al.

(10) Patent No.: US 6,704,656 B1
(45) Date of Patent: Mar. 9, 2004

(54) METHOD, APPARATUS AND COMPUTER PROGRAM PRODUCT TO ALLOW AUTOMATIC PRODUCT COMPOSITION

(75) Inventors: Andre Abriol, Austin, TX (US); Tracy Myers, Lakeway, TX (US); Kanai Pathak, Austin, TX (US); Peter J. Ireland, Austin, TX (US)

(73) Assignee: Schlumberger Technology Corporation, Austin, TX (US)

( * ) Notice: Subject to any disclaimer, the term of this patent is extended or adjusted under 35 U.S.C. 154(b) by 0 days.

(21) Appl. No.: 10/273,458

(22) Filed: Oct. 18, 2002

(51) Int. Cl.$^7$ .............................. G01V 1/40; G09G 5/00
(52) U.S. Cl. ........................................ 702/6; 345/763
(58) Field of Search ............................... 702/6; 345/763

(56) References Cited

U.S. PATENT DOCUMENTS

| | | | |
|---|---|---|---|
| 5,555,365 A | * | 9/1996 | Selby et al. ................. 345/765 |
| 5,873,049 A | * | 2/1999 | Bielak et al. .................... 702/6 |
| 6,195,092 B1 | * | 2/2001 | Dhond et al. ............... 345/334 |
| 6,429,882 B1 | * | 8/2002 | Abdelnur et al. ........... 345/763 |

OTHER PUBLICATIONS

"GIS/KEY Environmental Data Management System", U.S. Environment Protection Agency, EPA 540/SR–94/505, May 1994.*

"Management, Analysis and Display of Digital Well Log Data for Presentation of Geologic Information in the Third Dimension", Collins et al., Proceedings 9$^{th}$ Annual Symposium on Geographic Information Systems, vol. 1, Mar. 27–30, 1995.*

* cited by examiner

Primary Examiner—John Barlow
Assistant Examiner—Toan M Le
(74) Attorney, Agent, or Firm—Pehr Jansson; Brigitte L. Jeffery; John J. Ryberg (57) ABSTRACT

In a method for a well logging data presentation, data sets are identified from well logging data. Each data set is assigned a unique identifier. A presentation template, which defines a presentation for the well logging data, is configured. The presentation for the logging data may be in the form of a display and/or a hard copy. The presentation template includes definitions of a number of component presentations. Each component presentation includes a corresponding component template. Each component template includes a pointer pointing to a source for one of the data sets and defines a structure for the component's presentation. A graphical presentation program generates the presentation, responsive to reading the presentation template, component templates and data sets. The presentation can be viewed and changed while data is still being acquired.

27 Claims, 10 Drawing Sheets

| INDEX | CH 1 | CH 2 | CH 3 | CH 4 | CH 5 |
|---|---|---|---|---|---|
| 1450 | 98.74 | 2063.52 | 0.17 | 0.14 | 240.74 |
| 1460 | 98.66 | 2065.08 | 0.19 | 0.14 | 217.48 |
| 1470 | 98.60 | 2066.74 | 0.21 | 0.12 | 189.22 |
| 1480 | 98.56 | 2068.48 | 0.23 | 0.15 | 194.63 |
| 1490 | 98.60 | 2070.29 | 0.23 | 0.14 | 195.14 |
| 1500 | 98.68 | 2072.16 | 0.24 | 0.13 | 182.12 |
| 1510 | 98.78 | 2074.05 | 0.25 | 0.15 | 160.69 |
| 1520 | 98.82 | 2076.01 | 0.27 | 0.14 | 142.08 |
| 1530 | 98.77 | 2078.06 | 0.29 | 0.13 | 142.86 |
| 1540 | 98.74 | 2080.19 | 0.30 | 0.13 | 131.60 |
| 1550 | 98.65 | 2082.36 | 0.29 | 0.17 | 126.77 |
| 1560 | 98.24 | 2084.61 | 0.34 | 0.15 | 143.59 |
| 1570 | 98.26 | 2087.19 | 0.41 | 0.15 | 58.83 |
| 1580 | 98.46 | 2089.84 | 0.42 | 0.16 | 39.00 |
| 1590 | 99.23 | 2092.41 | 0.37 | 0.13 | 35.43 |
| 1600 | 100.40 | 2094.52 | 0.26 | 0.11 | 206.06 |
| 1610 | 100.67 | 2096.49 | 0.25 | 0.12 | 224.23 |
| 1620 | 100.74 | 2098.55 | 0.24 | 0.12 | 228.78 |
| 1630 | 100.78 | 2100.51 | 0.21 | 0.12 | 262.14 |
| 1640 | 100.80 | 2102.23 | 0.17 | 0.13 | 327.31 |
| 1650 | 100.80 | 2103.93 | 0.19 | 0.18 | 309.60 |
| 1660 | 100.81 | 2105.78 | 0.21 | 0.17 | 274.98 |
| 1670 | 100.83 | 2107.81 | 0.21 | 0.17 | 264.17 |
| 1680 | 100.87 | 2109.79 | 0.23 | 0.02 | 301.74 |
| 1690 | 100.90 | 2111.63 | 0.22 | 0.00 | 275.57 |
| 1700 | 100.92 | 2113.60 | 0.23 | 0.12 | 245.95 |
| 1710 | 100.94 | 2115.62 | 0.24 | 0.14 | 241.45 |
| 1720 | 100.97 | 2117.57 | 0.24 | 0.12 | 244.46 |
| 1730 | 101.00 | 2119.50 | 0.24 | 0.14 | 248.69 |
| 1740 | 101.02 | 2121.43 | 0.23 | 0.14 | 252.51 |
| 1750 | 101.03 | 2123.38 | 0.25 | 0.14 | 237.65 |
| 1760 | 101.05 | 2125.34 | 0.24 | 0.13 | 236.76 |
| 1770 | 101.06 | 2127.27 | 0.22 | 0.12 | 255.26 |
| 1780 | 101.05 | 2129.13 | 0.22 | 0.11 | 258.26 |
| 1790 | 101.00 | 2130.90 | 0.19 | 0.13 | 306.37 |
| 1800 | 100.98 | 2132.68 | 0.21 | 0.11 | 289.12 |
| 1810 | 101.01 | 2134.55 | 0.22 | 0.13 | 274.45 |
| 1820 | 101.03 | 2136.45 | 0.23 | 0.12 | 261.06 |
| 1830 | 101.06 | 2138.37 | 0.23 | 0.11 | 253.98 |
| 1840 | 101.09 | 2140.28 | 0.23 | 0.11 | 247.37 |
| 1850 | 101.12 | 2142.20 | 0.23 | 0.12 | 250.98 |
| 1860 | 101.14 | 2144.08 | 0.24 | 0.13 | 249.31 |
| 1870 | 101.17 | 2146.02 | 0.24 | 0.14 | 256.88 |
| 1880 | 101.20 | 2147.94 | 0.24 | 0.14 | 259.88 |
| 1890 | 101.24 | 2149.89 | 0.24 | 0.14 | 239.74 |
| 1900 | 101.25 | 2151.83 | 0.25 | 0.15 | 235.31 |

DATA SET 610
DATA SET ID "WELLPY421"
DATA SET 620
DATA SET 630

METHOD, APPARATUS AND COMPUTER PROGRAM PRODUCT TO ALLOW AUTOMATIC PRODUCT COMPOSITION

BACKGROUND OF THE INVENTION

1. Field of the Invention

The present invention relates to data acquisition and logging systems associated with exploration and production of subsurface resources, for example, oil, gas or water, and more particularly relates to preparing a logging report with a configurable format.

2. Related Art

The exploration for subsurface minerals typically requires various techniques for determining the characteristics of geological formations. Many characteristics, such as the hydrocarbon volume, resistivity, porosity, lithology, and permeability of a formation, may be deduced from certain measurable quantities associated with the geological formations. Drilling of a well to determine the characteristics of the geological formations is a well known technique. A data acquisition and logging 'tool' or 'system' is typically used to acquire information describing the well characteristics. The well may be, for example, and oil well, but can also be a well for exploration for other subsurface resources, such as gas and water.

Data Acquisition and logging systems generally include "Wireline" logging systems, and "Measurements While Drilling" (MWD) systems. MWD systems can also include "Logging While Drilling" (LWD) systems.

Wireline logging is typically the process by which oil or gas wells are surveyed to determine their geological, petrophysical or geophysical properties using electronic measuring instruments conveyed into the wellbore by means of an armored steel cable, known as a wireline cable. The data acquired by downhole instruments that are secured to the wireline cable are transmitted back to a back-end portion of the data acquisition and logging system located at the surface through electrical conductors in the wireline cable. Conventional wireline technology is well known in the oil and gas industry.

Measurement While Drilling typically take the same measurements as Wireline logging, but while the well is actually being drilled. Sensors are located within the actual drillstring. The measurement results can be transmitted to the surface via mud-pulse telemetry (or similar techniques), or stored in downhole memory, or both The information acquired by the logging system may then be used to prepare a customized oil well report for each customer. The customized report, also referred to as a logging report or a logging output, is useful by a variety of customers for making business decisions. For example, an oil company may use the report to make decisions regarding the commercial feasibility or attractiveness of the oil well. A government or a regulatory agency may review the logging report to grant drilling permits.

Present data acquisition and logging systems typically require time consuming manual operations to customize logging reports for each customer. A format and a source data file for each customized report are identified. For example, all measurements taken while logging may be recorded in a well known DLIS format that conforms to API RP 66—'Recommended Digital Log Interchange Standard ("DLIS"), V-1.00'. A report program or a script is typically executed to output the customized report.

What-if scenarios during the data acquisition operation often require changes to the customized report. A quick response to the changes, preferably incorporated before removing the logging tool from the oil well, is often desired. If a customer requires on-the-fly changes to the customized report, then the process of incorporating the changes often results in changing the template and reflowing the whole data set, line by line. Performing this change while data acquisition of the data set of interest is on-going is not possible because the template is still being used for that data acquisition (and is locked), and the data is represented in sequential files that have to be read from the beginning. Thus, many changes have to be remembered and performed when data acquisition is complete—delaying the creation of the products, which in turn delays their delivery to the customer, which can delay his decisions. Thus, flexibility to make changes is limited. Valuable time is often lost, and business decisions may be delayed by hours or days.

From the above it should be appreciated that there is a need to provide increased flexibility to prepare customized well reports from the exploration of petroleum and other sub surface resources, preferably completed before the tool is out of the hole. It would be desirable to have a flexible, report generation system that facilitates preparing customized reports more quickly and easily.

SUMMARY

The foregoing need is addressed by the present invention. According to one form of the invention, a method for a well logging data presentation includes identifying data sets from well logging data. Each data set is assigned a unique identifier. A presentation template, which defines a presentation for the well logging data, is configured. The presentation for the logging data may be in the form of a display and/or a hard copy. The presentation template includes definitions of a number of component presentations. Each component presentation includes a corresponding component template. Each component template includes a pointer pointing to a source for one of the data sets and defines a structure for the component's presentation. A graphical presentation program generates the presentation, responsive to reading the presentation template, component templates and data sets. The presentation can be viewed and changed while data is still being acquired.

According to another aspect of the invention, the well logging data presentation is reconfigured by modifying one of the presentation's component templates. The modifying includes changing the pointer of the component template to point to a different data set. The well logging data presentation is re-generated automatically in response to the modified component template and the different data set.

Other forms, as well as objects and advantages of the invention will become apparent upon reading the following detailed description and upon reference to the accompanying drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a block diagram illustrating grouping of logging data into data sets, according to an embodiment of the present invention.

DETAILED DESCRIPTION OF THE PREFERRED EMBODIMENT

In the following detailed description of the preferred embodiments, reference is made to the accompanying drawings illustrating embodiments in which the invention may be practiced. It should be understood, however, that the drawings and detailed description are not intended to limit the invention to the particular form disclosed, but on the contrary, the intention is to cover all modifications, equivalents and alternatives falling within the spirit and scope of the present invention as defined by the appended claims.

The present invention describes a method, apparatus and computer program product to allow preparation of customized well logging reports having a configurable format. According to one form of the invention, a method for a well logging data presentation includes identifying data sets from well logging data. Each data set is assigned a unique identifier. A presentation template, which defines a presentation for the well logging data, is configured. The presentation for the logging data may be in the form of a display and/or a hard copy. The presentation template includes definitions of a number of component presentations. Each component presentation includes a corresponding component template. Each component template includes a pointer pointing to a source for one of the data sets and defines a structure for the component's presentation. A graphical presentation program generates the presentation, responsive to reading the presentation template, component templates and data sets. The presentation can be viewed and changed while data is still being acquired.

Figure 1A:
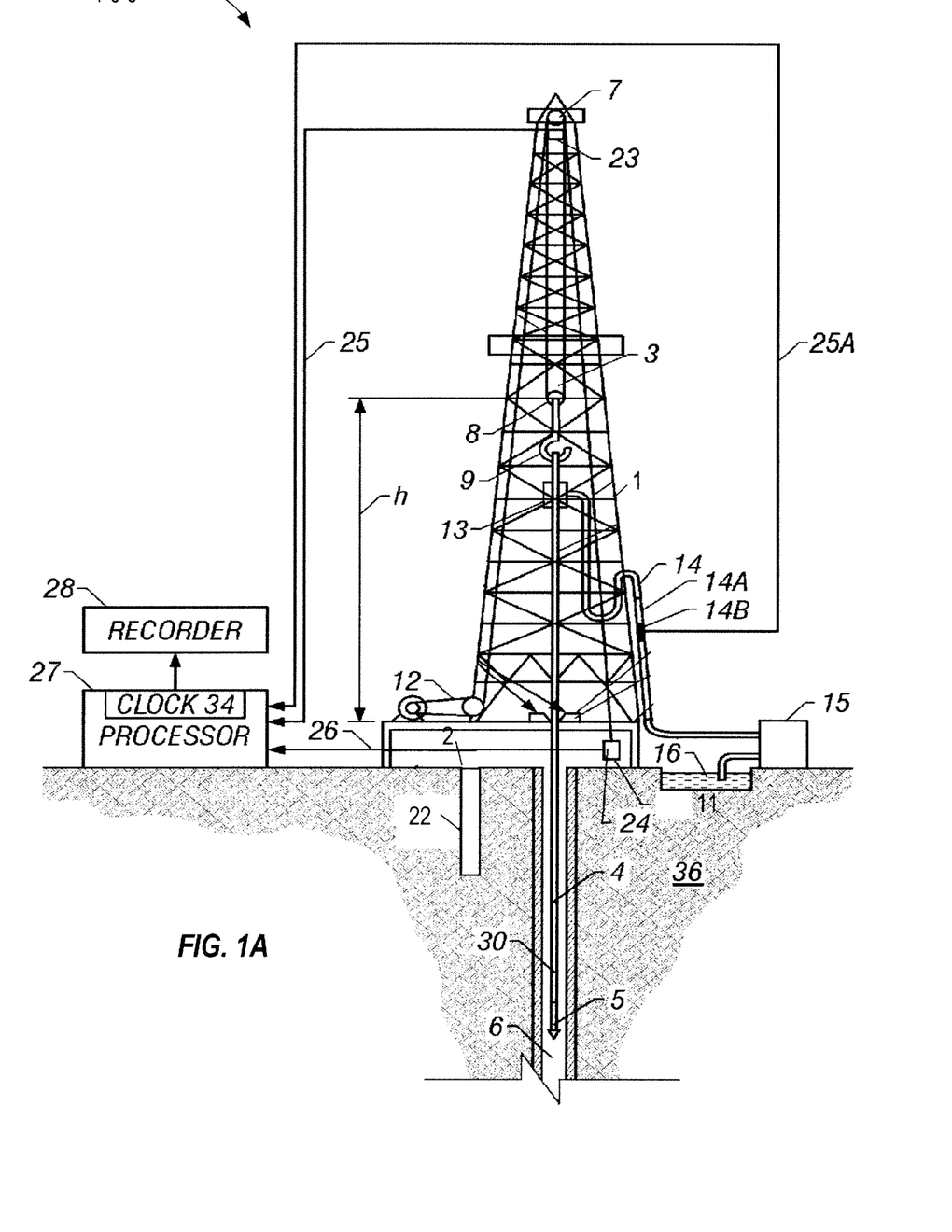
FIG. 1A illustrates a drilling rig and drill string in accordance with an embodiment of the present invention.

FIG. 1A illustrates a drilling rig 100 and drill string with a downhole data acquisition and logging system for exploring drill hole environment 36. Drill string 4 is suspended from hook 9 by means of swivel 13 linked by hose 14 to mud pump 15, which permits the injection of drilling mud into well 6, via the hollow pipes of drill string 4. Hose 14 is attached to standpipe 14A. Attached to standpipe 14A, one or more sensors 14B receive signals from within the well 6 via mud pulse telemetry. Mud pulse telemetry sensors 14B are coupled via signal line 25A to processor 27. Processor 27 incorporates a clock 34. Accordingly, sensors 14B function as measurement tools for delivering measurements to processor 27 and recorder 28. Processor 27 includes a clock 34 for providing a time measurement, as described in greater detail below. The drilling mud may be drawn from mud pit 16, which may be fed with surplus mud from well 6. The drill string may be elevated by turning lifting gear 3 with winch 12 and the drill pipes may be successively removed from (or added to) well 6 and unscrewed in order to remove bit 5.

The lowermost portion of the drill string 4 may contain one or more tools, as shown as tool 30 for investigating downhole drilling conditions or for investigating the properties of the geological formations penetrated by the bit 5 and borehole 6. Tool 30 is a logging tool capable of logging one or more different types of measurements and includes at least one measurement sensor. Tool 30 may be equipped for logging measurements of resistivity, gamma ray, density, neutron porosities, calipers and photoelectric effect as may be desired. Further, tool 30 may be equipped to include sensors for drilling-related measurements such as direction, depth, inclination and include equipment for data recording and telemetry.

Variations in height h of traveling block 8 during drill string raising operations are measured by means of sensor 23, which may be an angle of rotation sensor coupled to the faster pulley of crown block 7. Sensor 23 and strain gauge 24 are connected by signal lines 25 and 26 to a processor 27 which processes the measurement signals.

The oil well data acquisition and logging system, is typically used to acquire information describing the oil well characteristics. The information may be acquired in real-time by a sensor equipped drilling tool 30 and communicated to the back-end portion of the logging system for performing additional processing. The data is typically acquired and recorded while the drilling tool 30 is in the oil well, and transmitted to the surface shortly after being acquired, by mud-pulse telemetry, or another method with limited bandwidth. The transmission is completed substantially while the drilling tool 30 is in the oil well. It is well known that only a subset of the recorded data can be transmitted as real-time data because of the limited data transfer rates of down-hole telemetry systems.

Figure 1B:
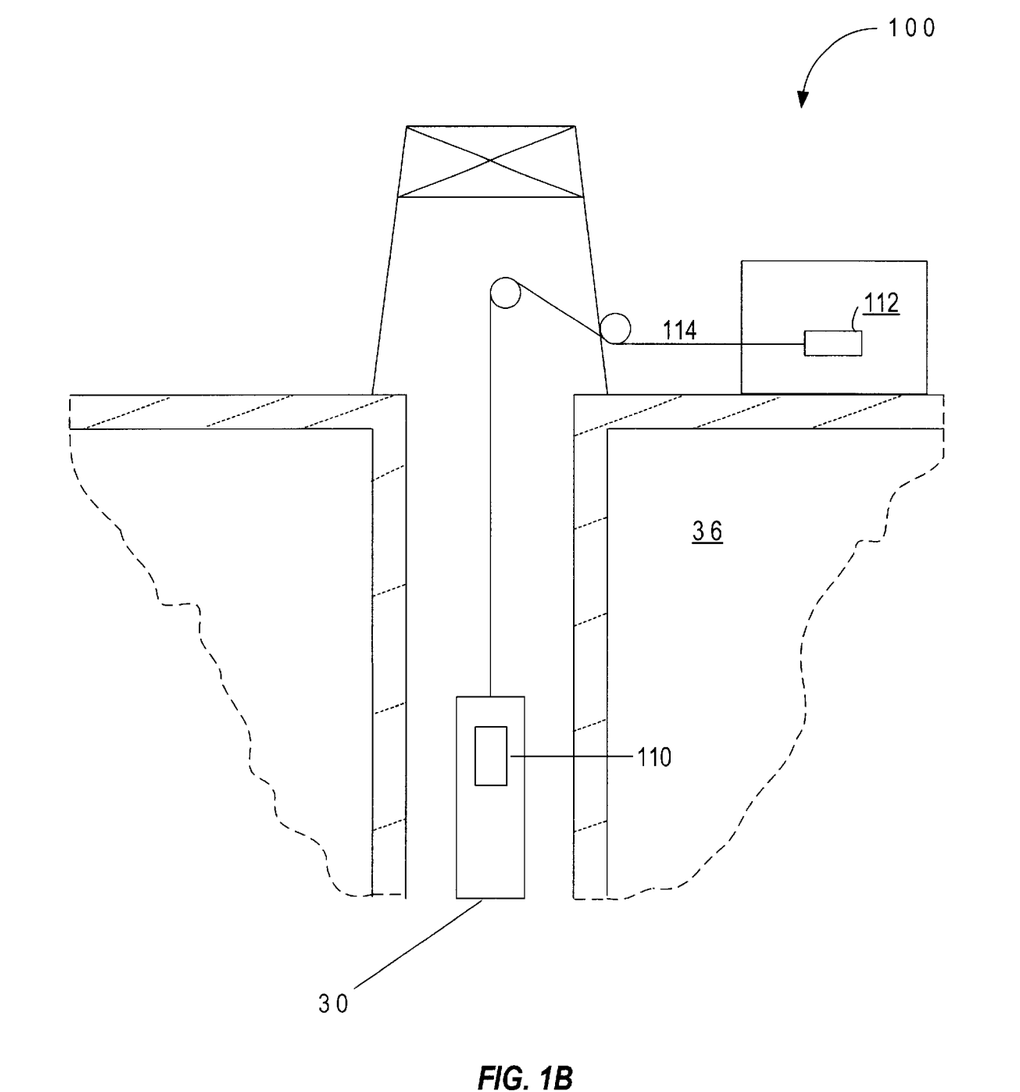
FIG. 1B illustrates a wireline logging system in accordance with an embodiment of the present invention.

Referring to FIG. 1B, an embodiment of the apparatus of the present invention is illustrated in a wireline logging system 105. As shown in FIG. 1B, a transmitter 110 receives the acquired data from the downhole well-logging instruments included in the tool 30, the data being indicative of properties of the surrounding geological formation. The transmitter 110 communicates the acquired data to the surface receiver 112 via a logging cable 114. The logging cable 114, which may be also referred to as a wirleline cable, is an example of a bandpass channel. A "bandpass channel" is a communications link that transmits only a limited range of frequencies and thus does not lend itself well to the direct transmission of all acquired data and information. A back-end portion (not shown) of the wireline logging system 105 located at the surface may include a computer system to process the acquired data. In one embodiment, the back end portion may include the surface receiver 112.

Figure 2:
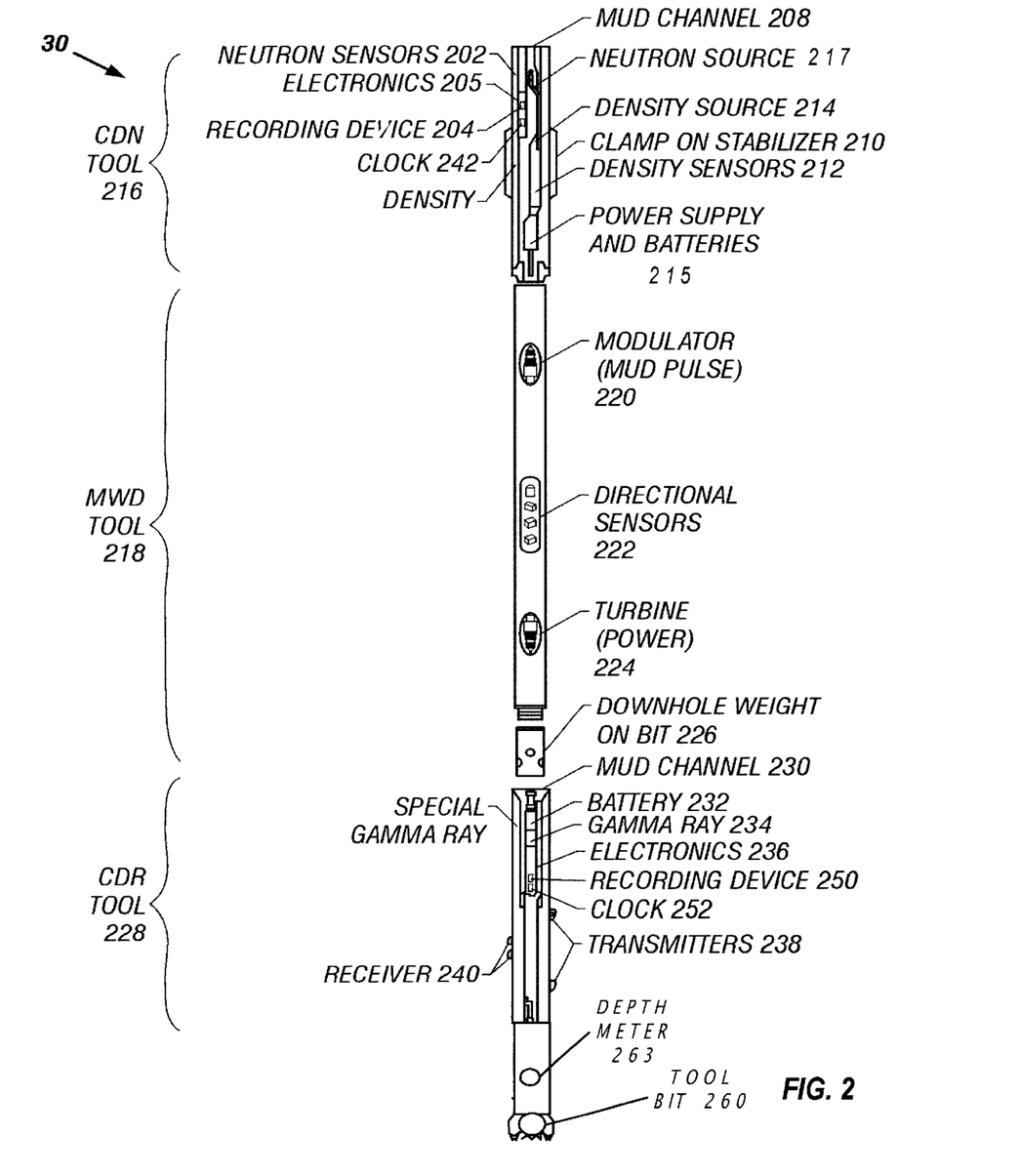
FIG. 2 illustrates a drilling bottom hole assembly (BHA) with several tools appropriate for embodiments of the present invention.

Referring to FIG. 2, a more specific view of the tool 30 is shown. The tool includes equipment according to an embodiment of the present invention appropriate for logging while drilling (LWD) and measurement while drilling (MWD), as design requirements may dictate. As shown, tool 30 includes three portions, each of which may be included or excluded from the tool 30, as measurement system requirements require. The tool 30 may include a compensated dual resistivity tool (CDR) or other type of resistivity tool 216, a measurement-while-drilling (MWD) tool 218, a compensated density neutron (CDN) tool 228, as well as other known specific measurement type tools. Each of the CDR, MWD and CDN type tools, as chosen are coupled together to form tool 30. Specifically, a CDN tool 216 includes neutron sensors 202, a neutron source 217, a density source 214, clamp on stabilizers 210, density sensors 212 and power supply and batteries 215. The CDN tool 216 further provides a mud channel 208 that allows mud to flow through the tool 216. CDN tool 216 further includes electronics 205, which may include a recording device and a clock.

The CDN tool 216 can be coupled above an MWD tool 218. MWD tool 218 includes a modulator 220 for transmitting via the mud channel 208, directional sensors 222 configured to triangulate the location of tool 30 and a turbine 224 configured to provide power to the tool 30. MWD tool 218 further includes a downhole weight for a bit 226, which includes torque sensors. The MWD tool 218 may be coupled to a CDR tool 228. CDR tool 228 is shown including a mud channel 230 that flows through the tool 30, battery 232, gamma ray equipment 234, electronics 236, transmitters 238 and receivers 240. As one of skill in the art appreciates, the number of transmitters and receivers is according to design requirements. Electronics 236 includes a recording device 250 coupled to a clock 252. CDR tool 228 or the MWD tool 218, determined according to the configuration chosen for the tool 30, are coupled to a motor and a drill bit 260 configured to drill in the drill hole environment 36.

LWD tools, which include CDN tool 216, CDR tool 228 and MWD tool 218 provide measurements that indicate a hole trajectory and provide drilling mechanics measurements in real time. LWD measurements provide resistivity, neutron, density and gamma ray measurements, among other measurements in real time. Thus, oil well data acquisition and logging systems, which include various sensors, tools, and associated communication and computer systems, reduce drilling costs by providing measurements, and logging reports during a drilling procedure. Providing real-time feedback during the drilling procedure advantageously improves the decision making process. A further benefit of LWD and MWD is that the measurements stored in recording devices 204 and 250, may be combined with wireline logs for a complete evaluation of the formation 36.

Wireline logs are typically taken downhole, transmitted through the wireline to the surface based computer systems and recorded at the surface. MWD and LWD logs are also typically taken downhole. They are either transmitted to the surface based computer systems by mud pulses, or else recorded downhole by recorder 28 and retrieved later when the tool 30 is brought to surface. Mud logs that describe samples of drilled cuttings are taken and recorded on surface.

The data acquisition and logging system that includes tool 30, according to an embodiment of the present invention, is equipped to provide a method and apparatus for preparing a logging report in a configurable format. A presentation of the report can be viewed and changed while logging data is still being acquired. LWD and MWD tools include sensors, such as transmitter 238 and receiver 240 that measure different characteristics of the formation. In practice, the drilling of an oil or gas well requires repeated movement the sensors of the tool 30 over a same area. For example, when tool bit 260 requires replacement, the tool 30 is removed from the well and replaced. Further, during the course of drilling a well, the drill bit and drill string will be "reciprocated" within the borehole (moving it up and down) to assist in cleaning the hole (ensuring the cuttings are circulated to surface) and general hole conditioning. Thus, during the drilling of an oil or gas well, tool 30 retracts repeatedly during the course of drilling and measuring the geological formation.

In an embodiment, tool 30 is configured to take advantage of the repeated retracting and insertion of the tool 30. More particularly, in the embodiment, a clock, such as clock 252 within tool 30, or clock 34 outside the tool 30, is synchronized with a depth measurement of the tool 30 to operate measurement tools within tool 30 that log measurements of resistivity, gamma ray, density, neutron porosities, calipers and photoelectric effect. According to the embodiment, the tool 30 repeatedly correlates one or more predetermined depths or zones of interest with a time parameter and associates the correlated time/depth measurement with the qualitative log measurements.

Figure 3:
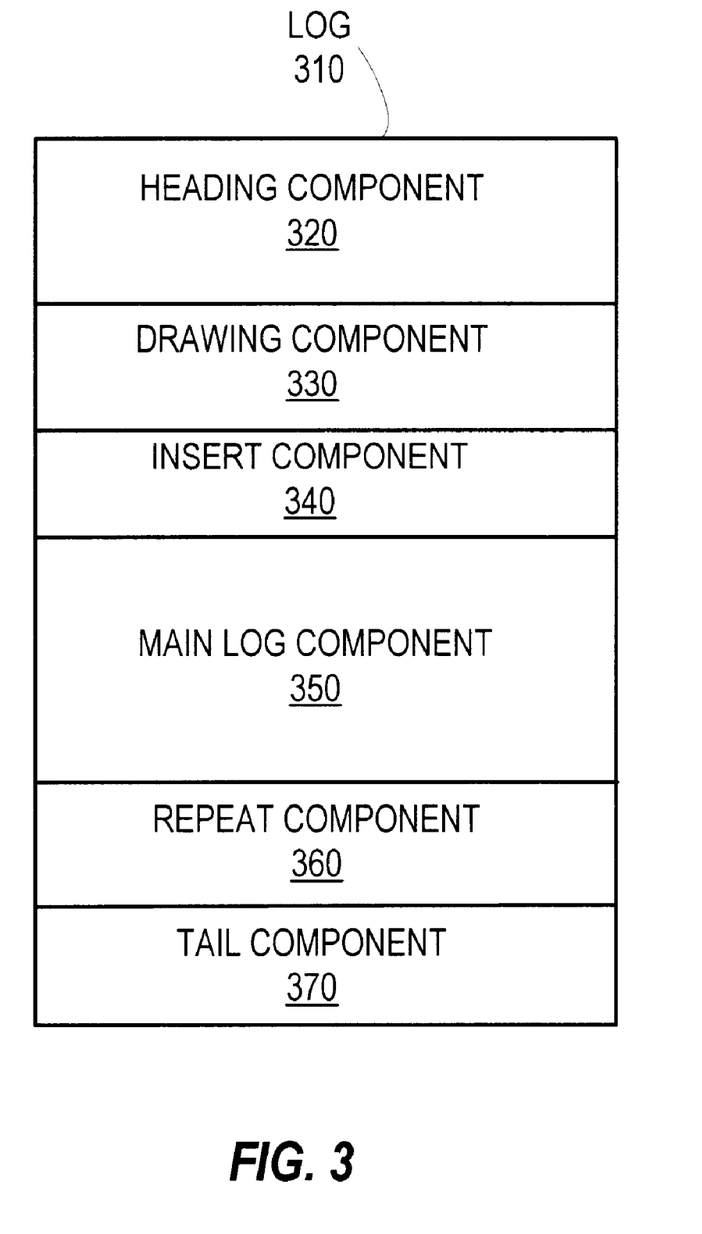
FIG. 3 is a block diagram illustrating components of a logging report, according to an embodiment of the present invention.

Referring to FIG. 3, components of a logging report are illustrated. A log is a record of measurement values of one or more measurement variables describing the characteristics of the oil well. The logging report 310, or simply 'log', typically includes acquired data for the measurement variables versus depth or time, or both. The log 310 is generally displayed on a computer display terminal or printed on a hard copy medium, e.g., a strip of paper or film, illustrating measured depth in one axis. If printed, the log 310 is generally printed on an accordion-style folded paper having a long length, e.g., 20 feet.

The logging report typically includes a number of components, sections or compositions. The composition of each log typically depends on the application requirements, and may vary for each oil well. Thus, the number of components included in the log 310 is configurable. For example, the illustrated log 310 has six components that include a heading component 320, a drawing component 330 that includes a drawing of the oil well and a drawing of the logging tool, an insert component 340 that describes the scales for the measurement variables displayed including the depth scale, a main log component 350 that shows values for each of the measured variables versus depth, or time or both, a repeat component 360 to determine the repeatability of the measurement, and a tail component 370 that includes data about the well, the recording parameters and the calibration information.

In another embodiment, the log 310 includes a separate component for calibration data. To ensure the quality of data, the oil well operator typically ensures that each tool run has been calibrated in accordance with recognized industry practice to ensure the accuracy of measurements taken. The calibration is checked prior to and following each logging run, to verify the validity of the existing calibration. The repeat component 350 of the log 310 is important since it assists in verifying the repeatability of logging measurements.

On acquiring logging data in an oil well, a customized final product is often required. The composition of the final product may include both prints and digital data files. The prints include a multitude of different components, which may change during the job. Each job typically includes a large number of different prints. The digital file requires a definition of a set of parameters and channels, and is of a particular file format.

Figure 4:
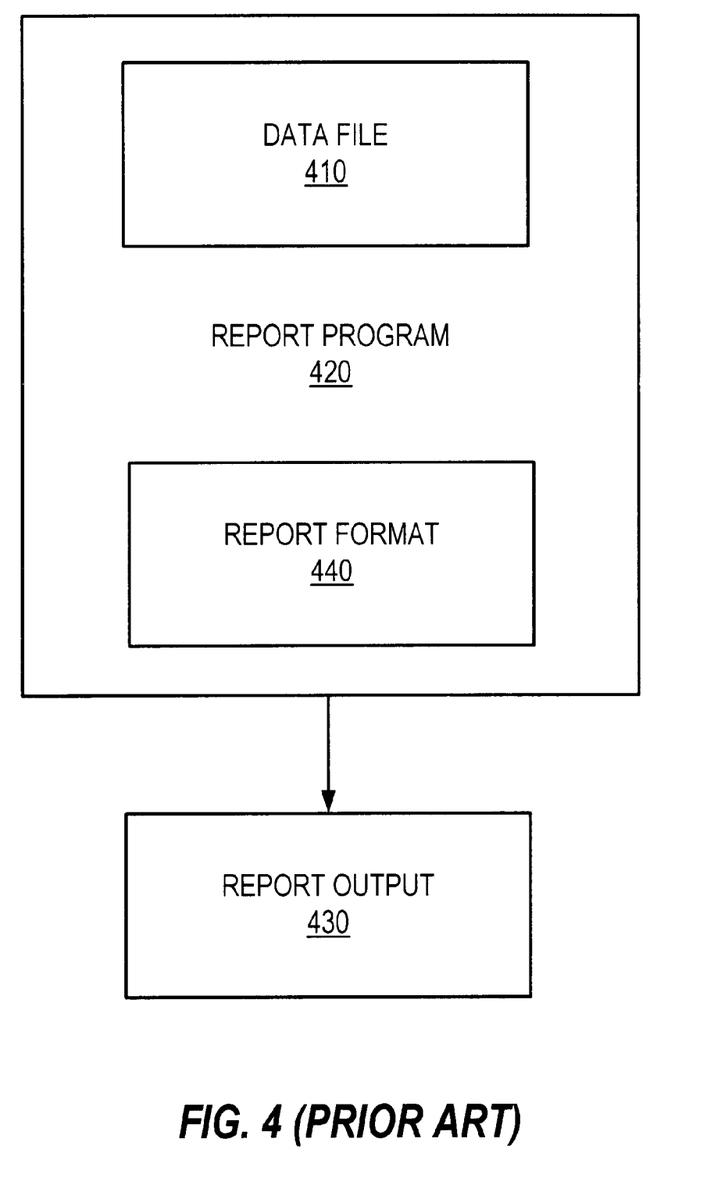
FIG. 4 is a block diagram illustrating preparation of a logging report, according to prior art.

Referring to FIG. 4, a block diagram is illustrated for preparing a logging report, according to prior art. In the prior art, logging data describing an oil well is acquired and stored as a data file 410 in memory media using well known formats such as ASCII, or DLIS. The data file 410 typically includes values for each of the measured variables arranged in a tabular format. Each row of the table is identified by an index, and each column represented values for the measured variable. Once acquired and stored the contents of the data file are static, e.g., the contents of the data file do not change. A software program 420 or script is written to read input from the data file 410, and generate an output report 430. A format 440 for the logging report is predefined by the user, and is also included as input instructions into the program 420.

The user typically executes the program 420 to generate the logging report 430. On executing the program 420, the program receives input from the data file 410, one row at a time, and generates an output for each row. The outputs for all rows are typically saved as a fixed or static file in a well known format, e.g., PDF format, or the output is printed on a hard copy device. If the user desires a change in the report, e.g., a change in scale of one measured variable or a change in the data used to generate the report, the user has to go through a series of manual steps to incorporate the changes. For example, if new data is to be used, the user has to prepare a new data file name that includes the new data. The user then has to change references in the program 420 from the old data file name to the new data file name. For each change in either the data or the template, the data set is re-read by the program, using the new template (if appropriate) to generate a new output file. The output files are then composed once again. All of this is accomplished by manual steps after data acquisition is complete, and is typically inefficient.

Figure 5A:
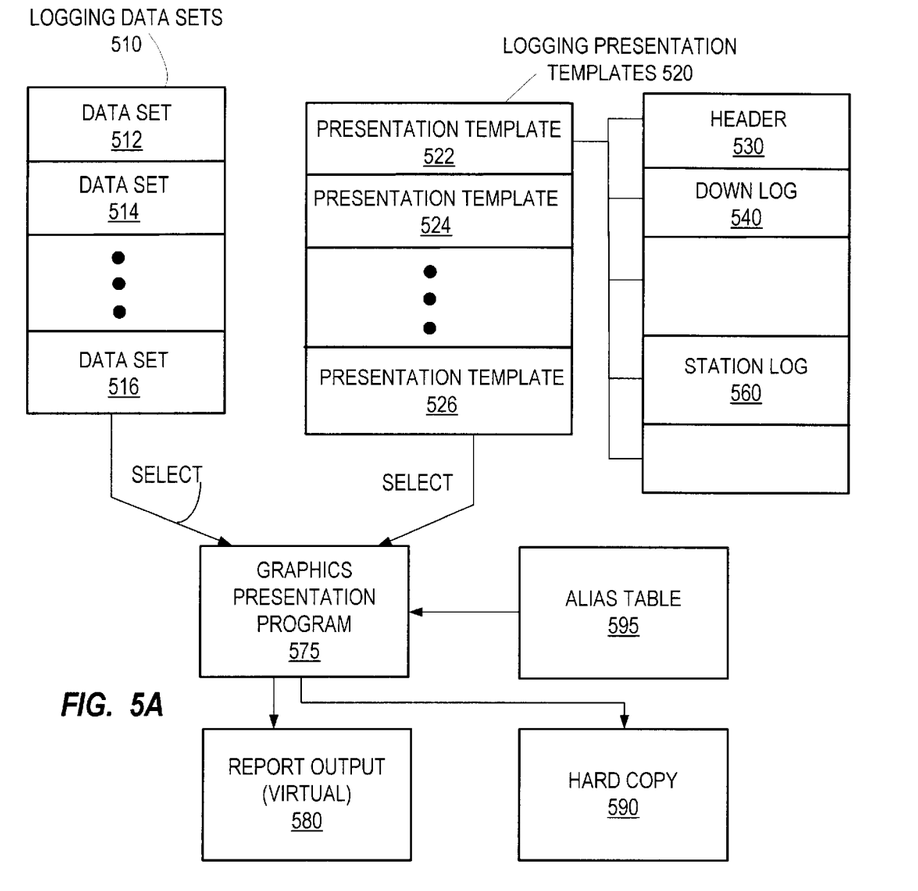
FIG. 5A is a block diagram illustrating preparation of a logging report, according to an embodiment of the present invention.

Referring to FIG. 5A, a block diagram illustrates preparing a presentation of a logging report, according to an embodiment of the present invention. Logging data describing an oil well is acquired and stored as data sets 510 in a database by the data acquisition and logging system. Logging data sets 510 include data set 512, 514 and 516. A data set such as data set 512 is configured by selecting some of the measurement variables, typically related ones, and assigning a unique identifier to them, as illustrated in FIG. 6 described below. A data set may include all of the data acquired or may include a subset of the data. A data set may also include other data sets, with each data set having a unique identifier.

A graphics presentation program 575 is operable to generate the presentation. The graphics presentation program 575 receives information from the templates 520, data sets 510 and an alias table 595 as inputs. The alias table 595, which is described in additional detail in FIG. 7 below, maps data sets 510 to their corresponding templates 520. The graphics presentation program 575 generates a report output (virtual) 580 and a hard copy 590 as outputs.

Referring to FIG. 6, grouping of logging data into data sets is illustrated, according to an embodiment of the present invention. Data set 610 includes all the logging data acquired by the logging system during the drilling operation. Data set 620 includes data values for channel 1 and channel 2 when the index is above 1700 but less than 1800. Data set 630, which has some overlapping data values with data set 620, may be similarly defined based on application requirements. A unique ID, e.g., wellpy 421, is defined to identify the data set 610. Similar unique ID's are defined to identify the data sets 620 and 630. Well-known techniques to identify software objects globally, such as a Global Unique Identifier (GUID), may be used. In one embodiment, data sets 610, 620, and 630 may be the same as data sets 510, 512, and 514 of FIG. 5A.

Figure 5B:
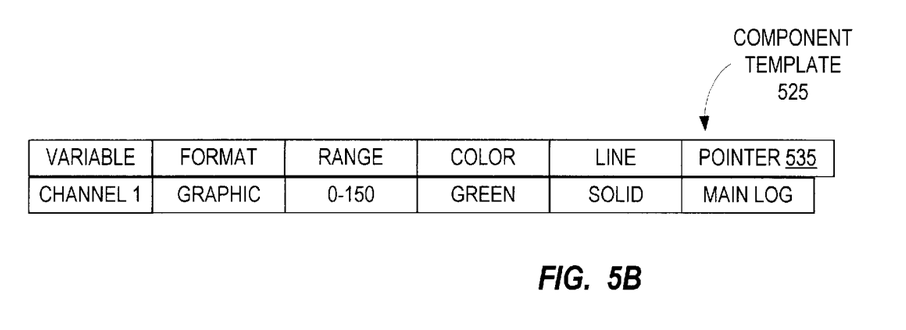
FIG. 5B is a block diagram illustrating a component template, according to an embodiment of the present invention.

As described earlier in FIG. 3, the logging report may include several components. Referring back to FIG. 5A, a presentation template 520 is configured for each type of customized logging report. For example, a customized presentation template may specify the following five components: header 530, down log 540, main log 550, station log 560 and time log 570. The composition of the logging report may be configured by adding or deleting one or more of the specified components. For each component of the customized logging report a corresponding component template 525 is prepared, as illustrated in FIG. 5B. The component template, which may be unique to each type of component, defines a structure for the information included in the report. The structure specifies a layout of the information included in the report. For example, in one embodiment the structure includes specific measurement variables, and the relative position of the measurement values of these variables relative to a reference and relative to each other. In another embodiment, the structure includes a definition for the file format, e.g., text, graphic. The component template also includes a pointer 535 pointing to a corresponding data set that will be utilized to create the component portion of the output file. The component template thus includes a reference, e.g., the pointer 535, pointing to the source of the corresponding data set 510, i.e., to the set's location, not the data set itself. The dynamically configurable coupling between the templates 525 and the data set 510 utilized to generate the presentation advantageously provides increased flexibility to make changes to the data and/or the template.

Figure 7:
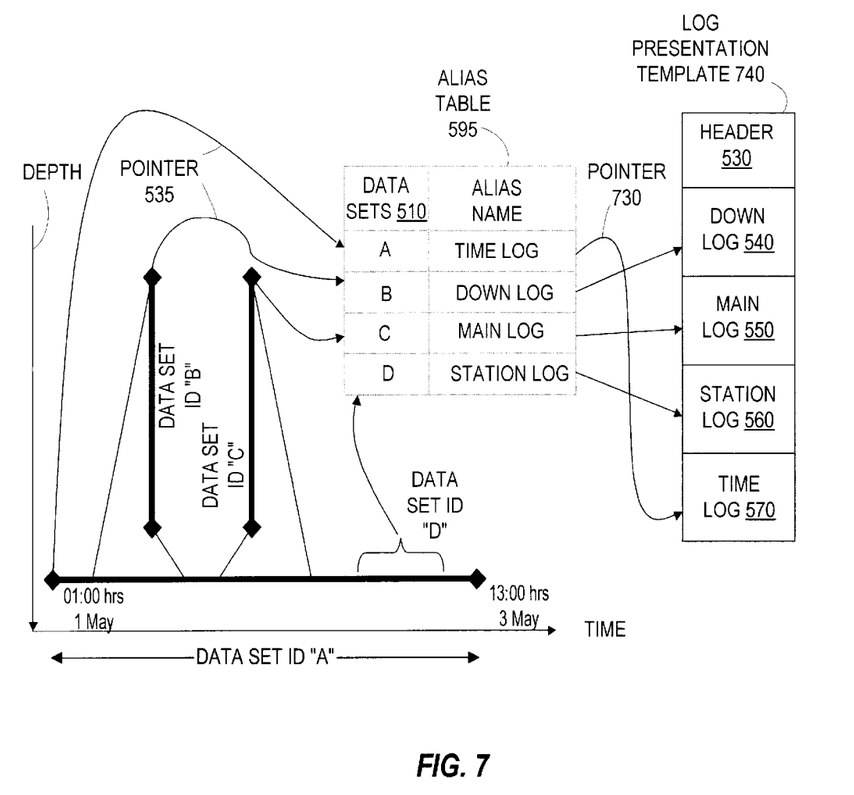
FIG. 7 is a block diagram illustrating a reference lookup of the data set corresponding to the template, according to an embodiment of the present invention.

Referring to FIG. 7, a technique to lookup a data set referenced by a template to generate the presentation is illustrated, according to an embodiment of the present invention. The lookup of the data set referenced by the template is configurable, depending on user requirements. For example, in one embodiment, the lookup of the data set may be set up automatically by a program, executing in real-time, if no changes to the presentation are contemplated. That is, the graphic presentation is generated automatically by the graphics presentation program 575 if no changes to the virtual output 580 of FIG. 5A are contemplated. In another embodiment, a program may perform the lookup of the referenced data set in an interactive manner and under the control of the user, while the logging tool is acquiring data. That is, the graphic presentation is generated interactively by the graphics presentation program 575 while logging data is being acquired in real-time. In yet another embodiment, a program may be launched, responsive to completing acquisition of data for the corresponding data set, to automatically perform the reference lookup. That is, a program, e.g., the graphics presentation program 575, is launched to automatically generate the graphic presentation in response the data acquisition being completed.

The alias table 595 is created by the user, such as at the time when the user selects data sets and configures the templates. The alias table 595 maps each entry in data sets 510 to the corresponding pointer 535 included in the component template 525. Data set 510 is shown to include four entries, each of which is uniquely identified by identifiers A, B, C and D respectively. In one embodiment, data sets A, B and D may be the same as data sets 512, 514 and 516 of FIG. 5A. Pointers 730 point to corresponding locations of data for each entry in the data sets 510. Thus, the alias table 595, when initially created, functions as a map to the data. This "map" is later used at the time the presentation is generated for viewing and/or printing, at which time the alias table 595 is read to determine the source file for the data. The data is read from the source file, and the data is then formatted in accordance with the format specified in the component template 525. The reference lookup function provided by the alias table 595 advantageously provides flexibility since a different data set may be linked to the same corresponding pointer, or the same data set may be linked to a different component template.

For example, in one embodiment, the logging system uses the weight of the mud in the well (as inputted by the user) in calculations to correct the measurement for the effects of that mud. After initial processing, it may be discovered that the mud weight used was incorrect, and a different value of the mud weight is used. A new data set that includes the new mud weight may be recomputed—and could be thought of as a new version of the old data set. The alias table 595 could automatically point to this new version. The definition of the reference lookup is completed when the alias table 595 and component templates are configured.

Referring back to FIG. 5A, in the embodiment where the reference lookup is configured under the control of the user, the user may select various data sets or templates in response to various what-if business scenarios or in response to changes the user observes in the logging presentation, while the logging tool 30 is still acquiring data. That is, a real-time presentation of the logging data, is generated as a virtual output 580 under the control of the user, stored in memory, and viewable on a display screen even while data is still being acquired. Thus, during data acquisition the user can generate a presentation that shows already-acquired data, the view of which is updated continuously as more data is acquired. This enables the user to change the presentation in response to viewing a partial data set as the data is acquired. For example, the Gamma Ray measurement (GR) may be presented from 0 to 100. During the measurement, values in excess of 100 may be acquired, and the user may need to change the scale so that all the data is visible within the track and may thus change the scale to 0–150. Another example may include a data zoom function. The logging data may be presented on a scale of 1:1000—which may allow a large amount of data to be presented on the screen. However, if the user may want to look at a particular section in greater detail, i.e., zoom in, then the user may change the scale to say 1:100 to view additional detail.

Once the logging presentation has been changed to an acceptable form, the user can then direct the system to generate a hardcopy 590 print out of the log as soon as all data has been acquired, i.e., at the end of the "data acquisition phase". This advantageously eliminates a need for the user to wait until all data has been acquired before configuring and viewing a presentation. Consequently the time required to generate the hardcopy 590 print out of the log is reduced, and may vary from merely minutes after completing data acquisition, to no more than about an hour, depending on the availability and performance of computational resources, and the amount of data. In some cases, the time interval is less than, or at least nearly equal to, the time which is required to retrieve a logging tool out of the oil well, in which case the logging report, which is typically a print out, and the logging data presentation, which is typically viewed on a display screen, are described as being "done when out of the hole."

In one embodiment, the virtual output 580 technique is used as a sort of graphical composer in which components are placed on an editable display screen, while receiving real-time data so that the components may be edited on-line, e.g., added, deleted, or modified, to observe the effects of changes on the log presentation.

To reiterate, it should be appreciated from the above that by the use of the alias table 595 and templates of the present invention, changes can be made in the source of data for a presentation or the structure of a presentation without changing the graphics generating program itself. Consequently, a presentation can be viewed and changed while data is still being acquired. This, in turn, enables generating a final presentation immediately upon completing data acquisition.

Figure 8A:
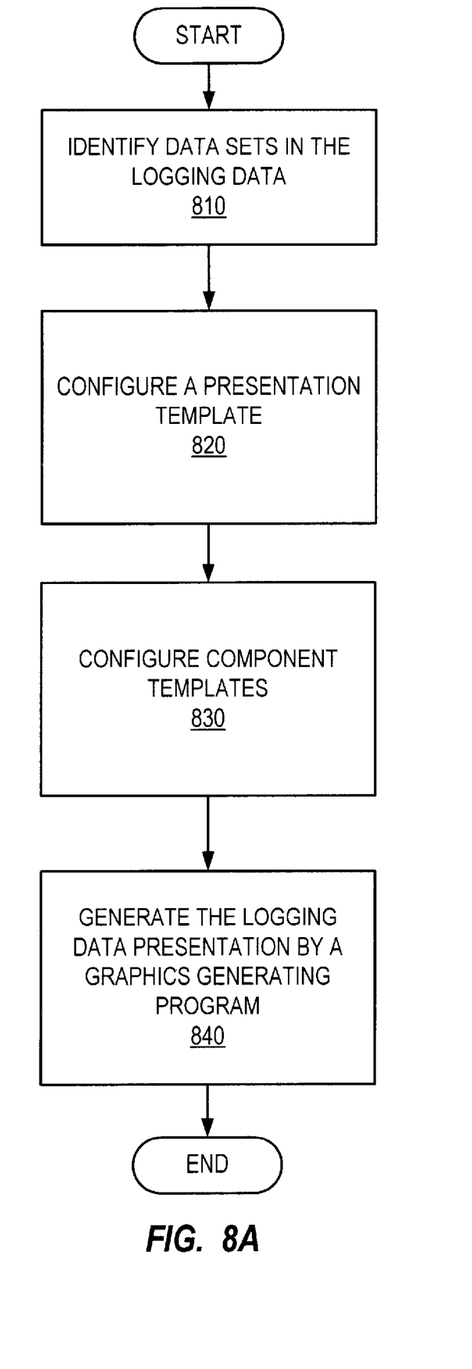
FIG. 8A is a flow diagram illustrating a method for a well logging data presentation, according to an embodiment of the present invention.

Referring to FIG. 8A, a method for a well logging data presentation is illustrated, according to an embodiment of the present invention. The data acquisition and logging system acquires the well logging data and stores it in memory. In step 810, various data sets included in the logging data are identified. An identifier uniquely identifies each data set. As described earlier in FIG. 6, the data sets are configured by grouping a set of related measurement values of the measurement variables into the uniquely identified data set.

In step 820, a presentation template defining a presentation for the logging data is configured. The presentation template configuration includes defining a number of component presentations. For example, in one embodiment, the presentation template defines seven component presentations that include presentations for a calibration component in addition to the six components described earlier.

In step 830, component templates are configured. Each of the component templates defines a structure for the logging data included in the component. For example, the structure may include defining the measurement variable, and parameters such as scale factor for plotting data values of the measurement variable versus a reference such as measured depth and/or time. A structure for the component template is illustrated in FIG. 5B, according to one embodiment. The structure for each component also includes the pointer 535 pointing to a source for one of the data sets.

In step 840, the well logging data presentation is generated by the graphics generating program 575 responsive to the presentation template 520, component templates and data sets 510. The presentation can be viewed while data is still being acquired.

Figure 8B:
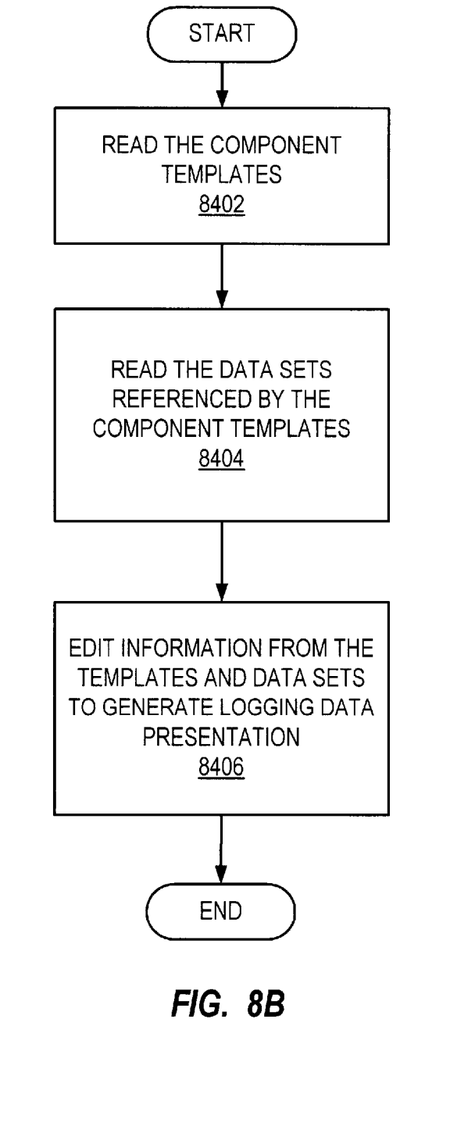
FIG. 8B is a flow diagram illustrating more details of generating the well logging data presentation described in FIG. 8A, according to an embodiment of the present invention.

Referring to FIG. 8B, more details of the graphics generating program 575 generating the well logging data presentation described in step 840 are illustrated, according to an embodiment of the present invention. In step 8402 the component templates are read by the graphics generating program 575, responsive to the presentation template. In step 8404, the data sets that correspond to each of the component templates are read, responsive to the pointers of the respective component templates. In step 8406, the graphics generating program 575 generates the well logging data presentation responsive to the structure defined by the respective component templates, so that changes can be made in the source of data or the structure of the presentation without changing the graphics generating program 575. Consequently, the presentation can be viewed while data is still being acquired and the presentation can be edited without changing the graphics generating program 575.

Various steps of FIGS. 8A, 8B may be added, omitted, combined, altered, or performed in different orders. For example, in one embodiment, steps 820 and 830 may be performed before step 810. In one embodiment, step 840 may be replaced by steps 8402, 8404 and 8406.

Figure 9:
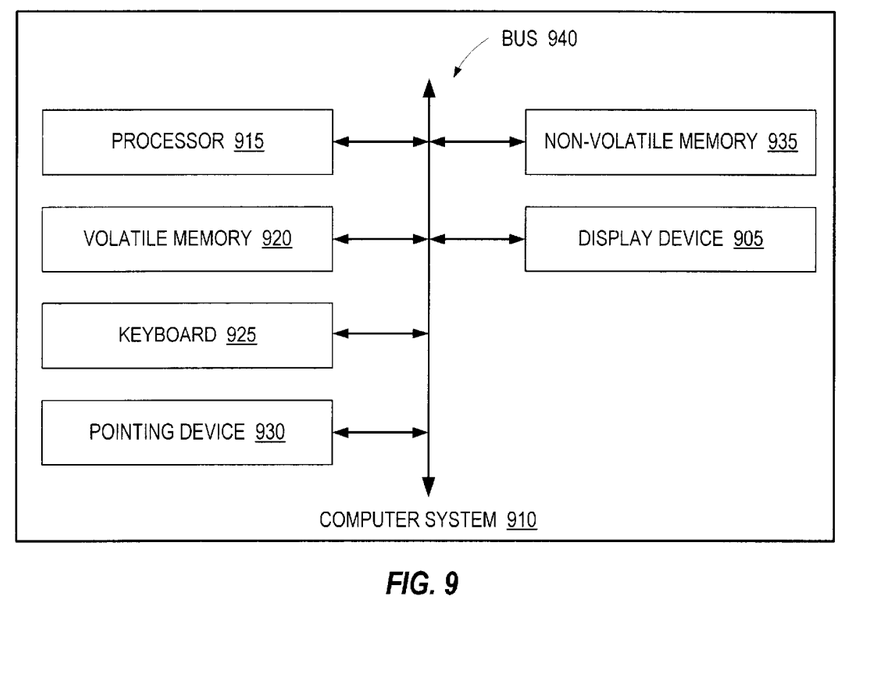
FIG. 9 is a computer system appropriate for implementing one or more embodiments of the present invention.

Referring now to FIG. 9, a computer system 910 is shown that is generally applicable for the various embodiments described. The system 910 includes a processor 915, a volatile memory 920, e.g., RAM, a keyboard 925, a pointing device 930, e.g., a mouse, a nonvolatile memory 935, e.g., ROM, hard disk, floppy disk, CD-ROM, and DVD, and a display device 905 having a display screen. Memory 920 and 935 are for storing program instructions, which are executable by processor 915 to implement various embodiments of a method in accordance with the present invention. The memory 920 and 935 may be used to store portions of the data sets. Components included in system 910 are interconnected by bus 940. A communications device (not shown) may also be connected to bus 940 to enable information exchange between system 910 and other devices such as other computer systems via a network such as the Internet.

In various embodiments system 910 takes a variety of forms, including a personal computer system, client/server system, mainframe computer system, parallel processing computer system, workstation, Internet appliance, PDA, an embedded processor with memory, etc. That is, it should be understood that the term "computer system" is intended to encompass any device having a processor that executes instructions from a memory medium.

The memory medium preferably stores instructions (also known as a "software program") for implementing various embodiments of a method in accordance with the present invention. In various embodiments the one or more software programs are implemented in various ways, including procedure-based techniques, component-based techniques, and/or object-oriented techniques, among others. Specific examples include XML, C, C++, Java and Microsoft Foundation Classes (MFC).

The description of the present embodiment has been presented for purposes of illustration, but is not intended to be exhaustive or to limit the invention to the form disclosed. Many modifications and variations will be apparent to those of ordinary skill in the art. To reiterate, the embodiments were chosen and described in order to best explain the principles of the invention, the practical application, and to enable others of ordinary skill in the art to understand the invention. Various other embodiments having various modifications may be suited to a particular use contemplated, but may be within the scope of the present invention. Those of ordinary skill in the art will appreciate that the hardware and methods illustrated herein may vary depending on the implementation.

Additionally, it is important to note that while the present invention has been described in the context of a computer system having a processor and memory, those of ordinary skill in the art will appreciate that the processes of the present invention are capable of being distributed as computer readable medium of instructions in a variety of forms and that the present invention applies equally regardless of the particular type of signal bearing media actually used to carry out the distribution. Examples of computer readable media include recordable-type media such a floppy disc, a hard disk drive, a RAM, CD-ROM, CD-RW, DVD and transmission-type media such as digital and analog communications links.

To reiterate, many additional aspects, modifications and variations are also contemplated and are intended to be encompassed within the scope of the following claims. Moreover, it should be understood that in the following claims, actions are not necessarily performed in the particular sequence in which they are set out.

What is claimed is:

1. A method for operating a computer to generate a well logging data presentation such that changes can be made to a source of data or a structure of the presentation without changing a graphics generating program generating the presentation, and thereby enabling viewing of the presentation while data is still being acquired, the method comprising:
   a) accepting identification of data sets of well logging data for the presentation;
   b) accepting a presentation template configured to define the presentation for the logging data, including the definition of a number of component presentations;
   c) accepting one or more component templates each having a definition of a structure for the component's presentation, at least one of the component templates having a pointer for pointing via an alias table to a source for one of the data sets, wherein the alias table is external to the component templates and the presentation template so that the source for the data set may be changed without changing the templates; and
   d) executing the graphics generating program to:
      read the component templates as directed by the presentation template;
      read ones of the data sets in response to the at least one pointers of the at least one component templates; and
      generate the well logging data presentation in response to the structure defined by the respective component templates.

2. The method of claim 1, wherein the presentation template, and the component templates are configured prior to acquiring the well logging data.

3. The method of claim 1 wherein the graphics generating program is further operable to generate the well logging presentation in response to a task to acquire the well logging data.

4. The method of claim 1, comprising:
   accepting a reconfiguration of the well logging data presentation, wherein the reconfiguration includes a selection of another one of the presentation's component templates; and
   re-generating the well logging data presentation in response to the selected component template.

5. The method of claim 1, wherein the structure identifies a plurality of channels, wherein each channel represents an oil well logging parameter or acquired data for a measured property included in the well logging data.

6. The method of claim 1, wherein the structure identifies a file format of the well logging data presentation.

7. The method of claim 1, wherein the generating of the well logging data presentation is completed approximately prior to retrieving a logging tool out of an oil well simultaneously to or nearly simultaneously to the logging tool being used to acquire the well logging data.

8. The method of claim 1, wherein the alias table defines mapping between the at least one component templates and its corresponding data set by pointing to the source for the data set.

9. The method of claim 1, comprising:
   accepting a reconfiguration of the well logging data presentation, wherein the reconfiguration includes a changed pointer of the alias table, wherein the changed pointer points to a different data set; and
   re-generating the well logging data presentation in response to the different data set.

10. A data acquisition and logging system operable to generate a well logging data presentation such that changes can be made to a source of data or a structure of the presentation without changing a graphics generating program generating the presentation, and thereby enabling viewing of the presentation while data is still being acquired, the system comprising:
    a processor; and
    a memory storing instructions operable with the processor, the instructions being executed for:
      a) accepting identification of data sets of well logging data for the presentation;
      b) accepting a presentation template configured to define the presentation for the logging data, including the definition of a number of component presentations;
      c) accepting one or more component templates each having a definition of a structure for the component's presentation, at least one of the component templates having a pointer for pointing via an alias table to a source for one of the data sets, wherein the alias table is external to the component templates and the presentation template so that the source for the data set may be changed without changing the templates;
    wherein ones of the instructions are for the graphics generating program, and wherein the graphics generating program instructions are executed for:
    reading the component templates as directed by the presentation template;
    reading ones of the data sets in response to the at least one pointers of the at least one respective component template; and generating the well logging data presentation in response to the structure defined by the respective component templates.

11. The system of claim 10, wherein the presentation template, and the component templates are configured prior to acquiring the well logging data.

12. The system of claim 10, wherein the generating is triggered by a task to acquire the well logging data.

13. The system of claim 10, comprising:

accepting a reconfiguration of the well logging data presentation, wherein the reconfiguration includes a selection of another one of the presentation's component template; and re-generating the well logging data presentation in response to the selected component template.

14. The system of claim 10, wherein the structure identifies a plurality of channels, wherein each channel represents an oil well logging parameter included in the well logging data.

15. The system of claim 10, wherein the structure identifies a file format of the well logging data presentation.

16. The system of claim 10, wherein the generating of the well logging data presentation is completed approximately prior to retrieving a logging tool out of an oil well, the logging tool being used to acquire the well logging data.

17. The system of claim 10, wherein the alias table defines mapping between the at least one component templates and its corresponding data sets, by pointing to the source for the data set.

18. The system of claim 10, comprising:

accepting a reconfiguration of the well logging data presentation, wherein the reconfiguration includes a changed pointer of the alias table, wherein the changed pointer points to a different data set; and re-generating the well logging data presentation in response to the different data set.

19. A computer program product for a logging system operable to generate a well logging data presentation such that changes can be made to a source of data or a structure of the presentation without changing a graphics generating program generating the presentation, and thereby enabling viewing of the presentation while data is still being acquired, the computer program product comprising:

instructions for a) accepting identification of data sets of well logging data for the presentation;

instructions for b) accepting a presentation template configured to define the presentation for the logging data, including the definition of a number of component presentations;

instructions for c) accepting one or more component templates each having a definition of a structure for the component's presentation;

at least one of the component templates having a pointer for pointing via an alias table to a source for one of the data sets, wherein the alias table is external to the component templates and the presentation template so that the source for the data set may be changed without changing the templates; and instructions for the graphics generating program, wherein the graphics generating program instructions are executed for:

reading the component templates as directed by the presentation template;

reading ones of the data sets in response to the at least one pointers of the at least one respective component templates; and generating the well logging data presentation in response to the structure defined by the respective component templates.

20. The system of claim 19, wherein the presentation template, and the component templates are configured prior to acquiring the well logging data.

21. The system of claim 19, wherein the generating is triggered by a task to acquire the well logging data.

22. The system of claim 19, comprising:

accepting a reconfiguration of the well logging data presentation, wherein the reconfiguration includes a selection of another one of the presentation's component templates; and re-generating the well logging data presentation in response to the selected component template.

23. The system of claim 19, wherein the structure identifies a plurality of channels, wherein each channel represents an oil well logging parameter included in the well logging data.

24. The system of claim 19, wherein the structure identifies a file format of the well logging data presentation.

25. The system of claim 19, wherein the generating of the well logging data presentation is completed approximately prior to retrieving a logging tool out of an oil well, the logging tool being used to acquire the well logging data.

26. The system of claim 19, wherein them alias table defines mapping between the at least one component template and its corresponding data set, pointing to the source for the data set.

27. The system of claim 19, comprising:

accepting a reconfiguration of the well logging data presentation, wherein the reconfiguration includes changed pointer of the alias table, wherein the changed pointer points to a different data set; and re-generating the well logging data presentation in response to the different data set.

* * * * *